United States Patent
Turlington et al.

(10) Patent No.: US 9,521,055 B2
(45) Date of Patent: Dec. 13, 2016

(54) NETWORK CONNECTIVITY MANAGEMENT

(75) Inventors: Matthew W. Turlington, Richardson, TX (US); Michael U. Bencheck, Richardson, TX (US); Scott R. Kotrla, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1420 days.

(21) Appl. No.: 12/618,234

(22) Filed: Nov. 13, 2009

(65) Prior Publication Data

US 2011/0116385 A1 May 19, 2011

(51) Int. Cl.
*H04L 12/26* (2006.01)
*H04L 12/46* (2006.01)
*H04L 12/24* (2006.01)

(52) U.S. Cl.
CPC ....... *H04L 43/0811* (2013.01); *H04L 12/4633* (2013.01); *H04L 12/4641* (2013.01); *H04L 41/0681* (2013.01)

(58) Field of Classification Search
CPC .. H04L 12/46; H04L 12/4655; H04L 12/4641; H04L 41/0681; H04L 41/022; H04L 43/0811

USPC ......................................................... 370/242
See application file for complete search history.

(56) References Cited

U.S. PATENT DOCUMENTS

| | | | | |
|---|---|---|---|---|
| 2006/0002292 | A1* | 1/2006 | Chang et al. | 370/225 |
| 2006/0047851 | A1* | 3/2006 | Voit et al. | 709/239 |
| 2006/0245436 | A1* | 11/2006 | Sajassi | 370/395.53 |
| 2008/0101361 | A1* | 5/2008 | Brown | 370/390 |
| 2008/0144657 | A1* | 6/2008 | Li | 370/466 |
| 2008/0285466 | A1* | 11/2008 | Salam | H04L 41/0226 370/241.1 |
| 2009/0327797 | A1* | 12/2009 | Wei | H04L 12/4641 714/2 |
| 2010/0054264 | A1* | 3/2010 | Sato | 370/400 |

* cited by examiner

*Primary Examiner* — Stephen J Clawson

(57) ABSTRACT

Network connectivity management includes monitoring a circuit, wherein the circuit is a virtual connection between multiple networks via a provider core network. A device receives a plurality of network management messages associated with the circuit, and a determination is made regarding whether the circuit is experiencing a connectivity issue based on the network management messages. When it is determined that the circuit is experiencing a connectivity issue, then certain actions can be initiated.

25 Claims, 5 Drawing Sheets

NETWORK CONNECTIVITY MANAGEMENT

BACKGROUND

Many telecommunications customers require performance guarantees regarding their network connectivity, particularly for business customers that rely on mission network-based applications. However, troubleshooting network connectivity issues can be challenging, particularly with more complex customer networks. For example, a network service provider may not have access to or control over a customer's networking equipment. Further, the service provider may utilize one networking technology for its high-performance core networks, while providing some other type of networking technology to its customers, thereby increasing the difficulty in troubleshooting network connectivity issues.

DETAILED DESCRIPTION

Figure 1:
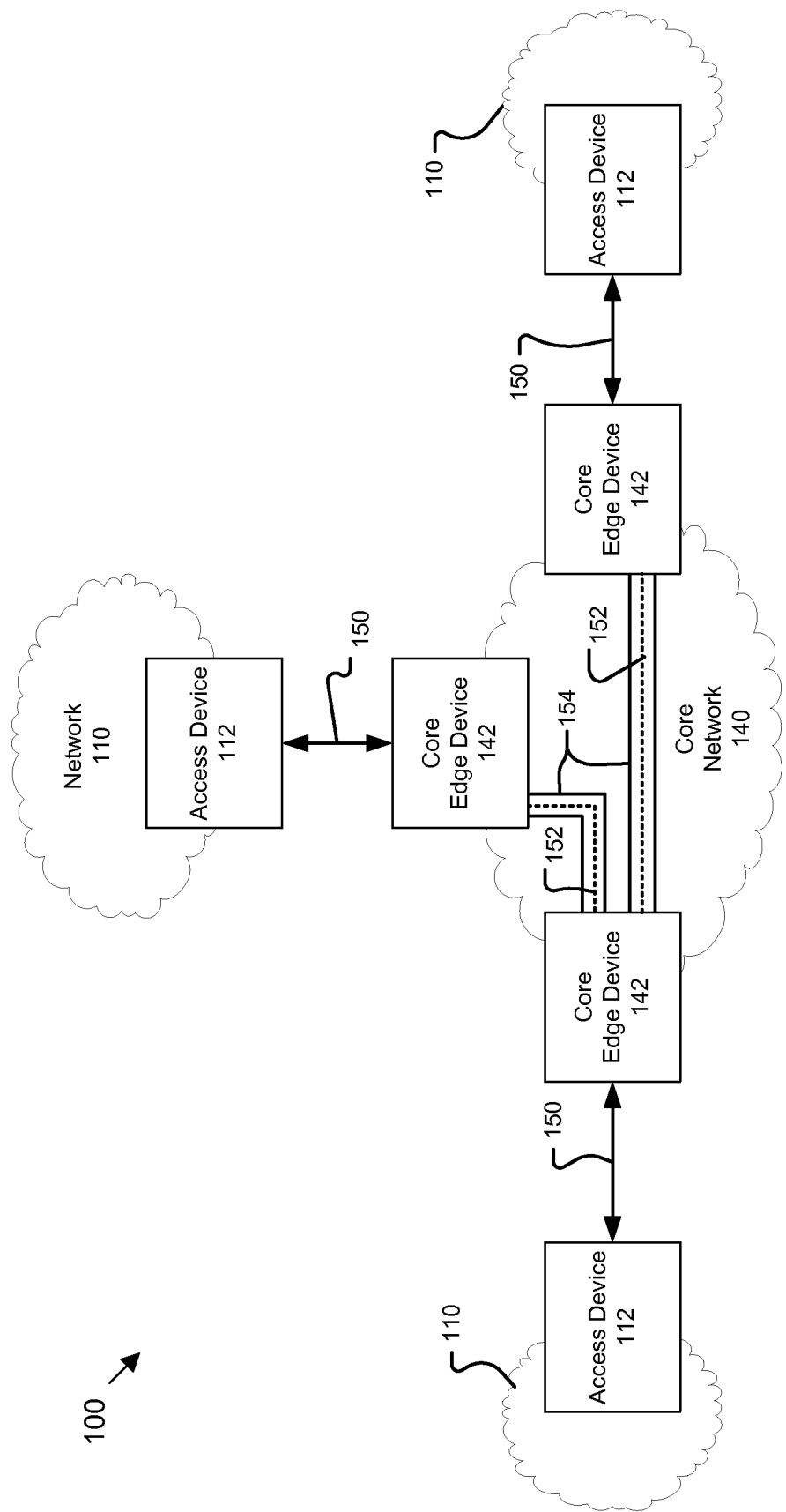
FIG. 1 illustrates an exemplary system for managing network connectivity between a customer network and a service provider network.

FIG. 1 illustrates an exemplary system 100 for managing network connectivity between at least one network 110 and a service provider core network 140. Core network 140 may utilize one networking technology for its high-performance core network, such as a data link layer networking technology like MultiProtocol Label Switching (MPLS). However, core network 140 may connect to networks 110 via some other type of networking technology, such as Ethernet, for example. Thus, core network 140 and networks 110 may utilize different protocols, and may be utilizing protocols that operate at different layers of the Open System Interconnection Reference Model (OSI Model). Thus, one network may be unable to utilize various Operations, Administration, and Maintenance (OAM) protocols, tools, and services provided by the other network.

For example, a network 110 may be an Ethernet network utilizing certain OAM tools, including IEEE 802.1ag, to monitor the health of a circuit. A circuit may be a logical connection (e.g., a logical communications pathway) over a wide area network between various networks. OAM is a general term that describes the processes, activities, tools, and standards involved with operating, administering, managing, and maintaining any system, including computer networks. 802.1ag is an IEEE standard used in connectivity fault management of an Ethernet network, particularly for paths through 802.1 bridges and local area networks (LANs) to monitor the health of a circuit. An Ethernet network may utilize 802.1ag to monitor an Ethernet Virtual Circuit (EVC), also discussed as a Virtual Local Area Network (VLAN) or Virtual Bridged Local Area Network.

However, because service provider core network 140 may utilize a protocol other than Ethernet, such as MPLS, the service provider may be unable to automatically respond to Ethernet OAM messages, including 802.1ag messages. Thus, while a service provider may be aware that a customer's EVC or VLAN is experiencing a connectivity issue by receiving an Ethernet OAM message in an Ethernet access network, the service provider may lack a system to automatically reflect the customer's EVC status into a corresponding MPLS pseudowire. System 100 provides mechanisms for troubleshooting a connectivity issue, including monitoring OAM messages associated with one protocol into an action affecting another network utilizing another protocol. For example, system 100 may be configured to receive Ethernet OAM messages, and perform some action in core network 140 based on the Ethernet OAM message.

As illustrated in FIG. 1, exemplary system 100 includes multiple networks 110 that are connected to one another via a service provider core network 140. Network 110 may be an access network associated with a service provider, some portion of a customer network, or some combination thereof. Networks 110 may be geographically separated, but provide access to the same customer (e.g., different customer locations connected by a wide area network provided by core network 140). Generally, each network 110 includes at least one access device 112, which is connected to a provider edge device 142 via one or more physical connection(s) 150. As discussed in detail below, networks 110 may utilize one type of networking technology, such as Ethernet, while core network 140 may utilize another type of networking technology operating at a data link layer, such as MPLS. Certain devices in network 110 may generate OAM messages based on certain connectivity issues, such as 802.1ag messages. System 100 is configured to allow core network 140 to receive, interpret, and respond to those OAM messages.

Networks 110 may be separated geographically and include any number and configuration of wired and/or wireless networks, local area networks, and/or wide area networks. In one example, a business entity includes multiple geographically separated locations represented by networks 110. Such a business entity may desire to connect networks 110 via a wide area network provided at least in part by core network 140. In another example, each network 110 may provide access to a separate business entity, but connect to one another to via core network 140 using one or more circuits 152 to support one or more network-based applications. For example, as discussed above, networks 110 may be Ethernet networks connected to core network 140 via access devices 112 and utilize Ethernet OAM, including 802.1ag. As illustrated in FIG. 1 and discussed in greater detail below, networks 110 may communicate with one another via one or more circuits 152, which are carried by core network 140 via a data link layer pathway 154, such as a pseudowire.

Core network 140 is typically a large-scale, high-performance telecommunications network that directs and carries data from one network node to the next. In one example, core network 140 is a collection of networks utilizing a data link layer core network, such as MPLS. Of course, core network 140 may additionally or alternatively utilize other protocols as well, such as Asynchronous Transfer Mode (ATM), Frame Relay, or some other data link layer protocol. In addition, core network 140 may provide network communication services to networks 110 via provider edge devices 142, including supporting circuits 152, such as VLAN tunneling and/or Ethernet Virtual Circuits (EVCs). In addition, core network 140 may utilize one or more pathways 154, such as pseudowires, to facilitate communications between various provider edge devices 142. Pathway 154 may be an emulated or virtual wire, such as a data link layer pathway or pseudowire, that emulates the operation of a wire carrying circuit 152, for example. Further, core network 140 typically utilizes OAM messages that correspond to the communications protocol being utilized, for example, core network 140 may utilize data link layer OAM messages, such as MPLS OAM messages, to identify and respond to certain connectivity issues.

Access devices 112 and provider edge devices 142 are networking devices that facilitate telecommunications services between a network 110 and core network 140. Generally, devices 112, 142 provide entry points into enterprise or service provider core networks, such as core network 140. For example, devices 112, 142 may be a router, a routing switch, an integrated access device, a multiplexer, or any of a variety of metropolitan area network (MAN) and wide area network (WAN) access devices.

In one example, provider edge device 142 is an MPLS Label Edge Router (LER) that terminates an Ethernet Access Network and hands off network traffic from network 110 to an MPLS core network within core network 140. Provider edge device 142 may be configured to receive IP datagrams from network 110, determine appropriate labels to affix to the IP datagrams using routing information, and then forward the labeled packets to the core network 140. Provider edge device 142 may also be configured to receive labeled packets from core network 140, and strip-off the label and forward the resulting IP packet to network 110. In addition, provider edge device 142 may support data link layer pathways 154, such as pseudowires, between provider edge devices 142 to carry network traffic.

Further, provider edge device 142 may support circuits 152, such as EVCs and/or VLAN tunnels, to create virtual connections between networks 110 via core network 140. In one example, access device 112 is configured to forward 802.1ag OAM messages to provider edge device 142. Provider edge device 142 may be configured to decode the 802.1ag OAM message, and generate a state change in core network 140 based on the received 802.1ag message, such as by taking down a pseudowire. For example, as discussed in detail below, provider edge device 142 may monitor 802.1ag to determine if a particular circuit 152 is having a connectivity issue, and when a connectivity issue is detected, then taking an action with respect to a corresponding pseudowire. In one example, an 802.1ag message is received indicating that a customer EVC is inoperable. A provider edge device 142 receiving the message may respond by indicating that the local side of the pseudowire associated with the customer EVC (i.e., the pseudowire carrying the customer EVC) is in a down state. Such an action may then trigger a label release message withdrawing the pseudowire from core network 140.

Generally, OAM messages, including 802.1ag messages, may contain an address, a time stamp, a sequence number, and some identifying information regarding a circuit. The time interval between various OAM messages, such as 802.1ag messages, is configurable. For example, the time interval between messages may be as low as 3.3 ms and as high as 1 minute. In one example, system 100 would be configured to use a time interval of approximately between 10 ms to 1 second. The time interval may be dependent on the type of service being monitored, or based on a service level agreement (SLA). In one example, system 100 utilizes 802.1ag Continuity Check Messages (CCMs) to monitor a circuit.

802.1ag OAM messages may include Continuity Check Messages (CCMs), which are generally based on a time interval. Typically, a CCM messages is a multicast message that may include a time stamp, a sequence number, address information regarding the sending device, or some other information. A CCM may be used to monitor the health of a circuit, such as a VLAN tunnel or Ethernet Virtual Circuit (EVC). 802.1ag OAM messages may also include Traceroute Message and Reply (TRM, TRR) and Loopback Message and Reply (LBM, LBR), which may be multicast from one hop along a network to the next hop to help isolate a particular continuity issue.

In one example, access devices 112 are configured to send and receive Ethernet OAM messages, including 802.1ag messages via core network 140. Provider edge device 142 may be configured to detect such Ethernet OAM messages, and translate them into an action affecting core network 140, such as by affecting a pathway 154.

As illustrated in FIG. 1, networks 110 are connected to one another via circuits 152, which are carried via pathways 154 in core network 140. For example, Ethernet circuits may be carried across an MPLS core network using pseudowires. Of course, networks 110 may have many circuits 152 to many different networks, including multiple circuits 152 between any two networks 110. Further, core network 140 may utilize multiple pathways 154 between two networks 110. For example, core network 140 may define multiple failover pseudowires between networks 110.

In order for a pathway 154 to become active, the access ports of the provider edge devices 142 on both sides of the circuit have to be up and operational. Generally, this merely requires that the ports are active. Thus, if circuit 152 (e.g., an Ethernet VLAN or EVC) is having a connectivity issue, the pathway 154 will remain active and continue attempting to send data across that path. However, provider edge device 142 may be configured to receive and interpret various network layer OAM messages, such as 802.1ag messages, generated by a network 110. Further, provider edge device 142 may be configured to translate those messages into an action affecting core network 140. In addition, access device 112 may be configured to translate an 802.1ag message into an action affecting core network 140, as discussed in greater detail below. Of course, such functionality could be implemented on any device that bridges networks between, such as a device that bridges an Ethernet network and an MPLS network.

In general, computing systems and/or devices, such as devices 112, 142, and the various network/communications devices used in networks 110, 140 may employ any of a number of well known operating systems, including, but by no means limited to, various versions and/or varieties of the Cisco IOS® (originally Internetwork Operating System), Juniper Networks JUNOS®, Alcatel-Lucent Service Router Operating System (SR OS), or any of a number of other such operating systems. Further, such systems and/or devices may employ utilize one or more of the following: Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
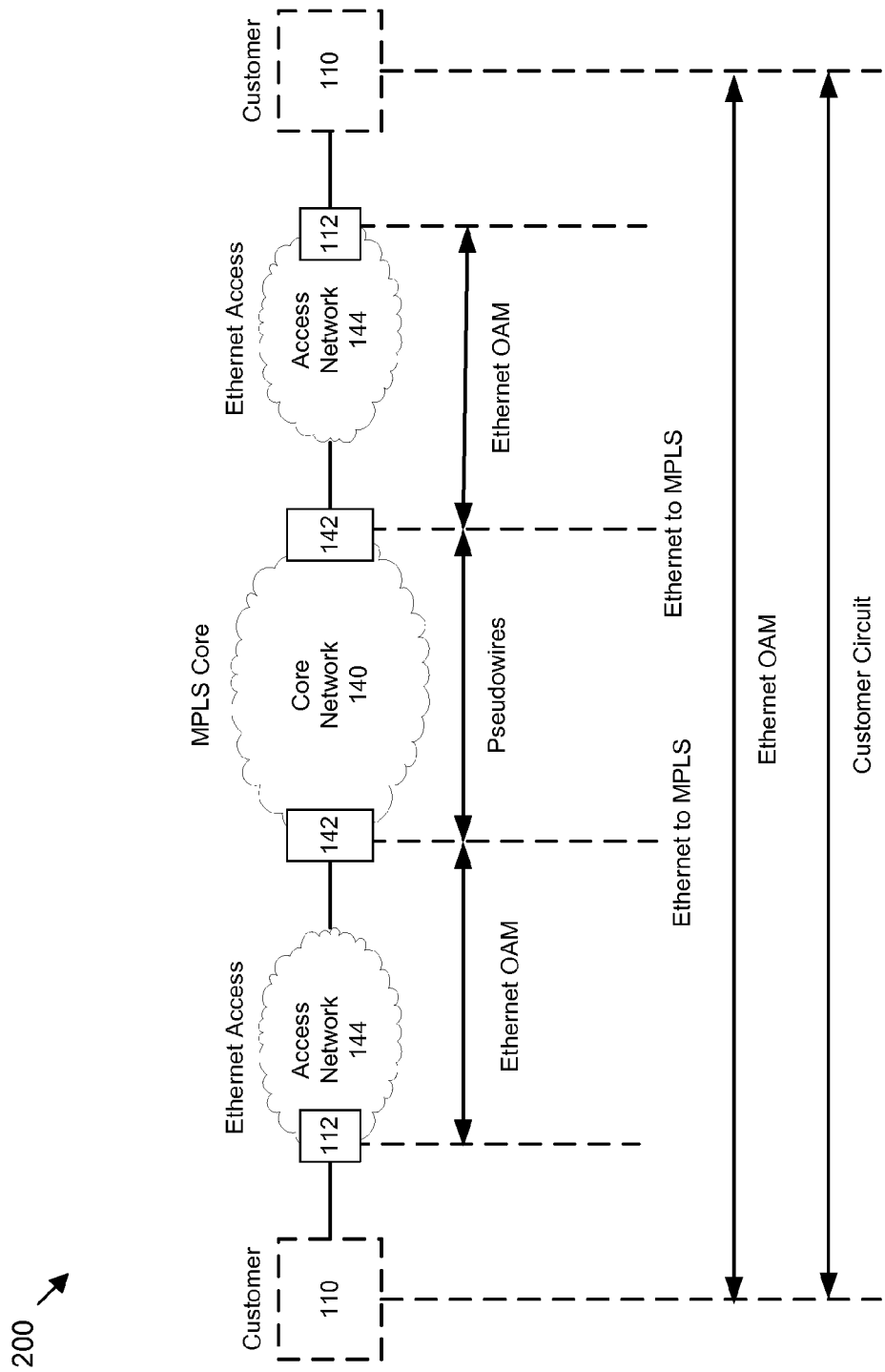
FIG. 2 illustrates another exemplary system illustrating an intermediate access network.

FIG. 2 illustrates another exemplary system 200 where at least one network 110 is connected to core network 140 via an access network 144. Access networks 144 may be part of a larger communications network used to connect networks 110 to core network 140. For example, core network 140 may be a core network utilizing MPLS for network communications, and access networks 144 may be used to interconnect a customer's Ethernet network to the MPLS core network 140. As illustrated in FIG. 2, networks 110 may be interconnected to one another via established circuits 152. Further, access networks 144 may utilize access devices 112 to communicate with core network 140 via provider edge devices 142, as illustrated in FIG. 2.

A circuit 152 may be an Ethernet Virtual Connection (EVC), an Ethernet Virtual Private Line (EVPL), a VLAN, a Virtual Private Network (VPN) tunnel, or some other mechanism to define a point-to-point Ethernet connection between networks 110 via core network 140. In an Ethernet access network 144, circuits 152 (e.g., EVCs and/or customer VLAN tunnels) interconnect networks 110 and are generally delineated and identified by VLAN tags. To monitor the health of a circuit 152, access devices 112 may be configured to communicate 802.1ag OAM messages over the circuit 152. Such Ethernet OAM messages are bi-directional, and thus the access device 112 at each end of the circuit 152 could be configured to send and receive such OAM messages.

As previously discussed, because networks 110 and core network 140 may utilize different networking technologies, certain OAM functionalities may be inaccessible to one of the networks. Thus, if a circuit 152 is having a connectivity issue, core network 140 may be aware of the issue, but unable to automatically take action in the core network. As illustrated in FIG. 2, Ethernet OAM messages may be communicated between networks 110 (provided the appropriate communications links are functioning), as well as between a network 110 and an access network 144.

Figure 3:
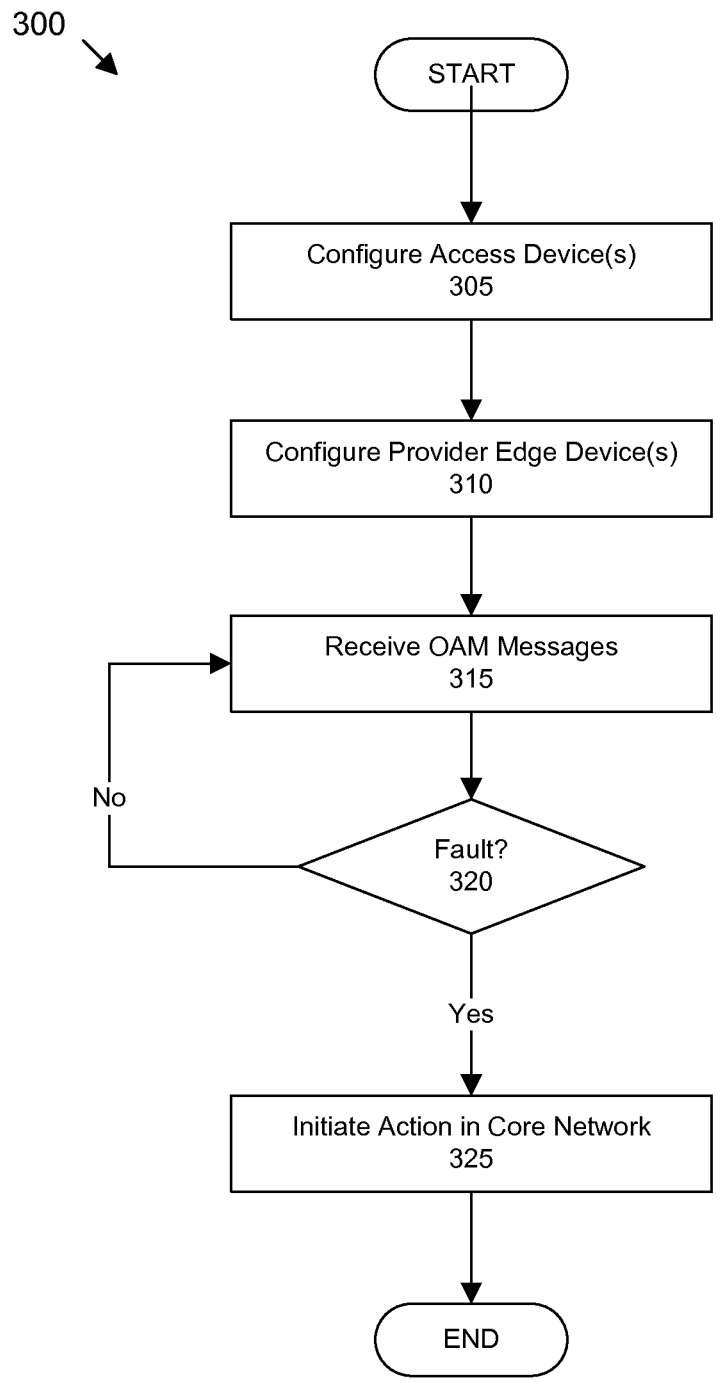
FIG. 3 illustrates an exemplary process for managing network connectivity between a customer network and a service provider core network.

FIG. 3 illustrates an exemplary process 300 for managing network connectivity between a network 110 and a service core network 140. Process 300 begins in block 305 by configuring an access device 112. Generally, an access device 112 may be configured by establishing a connection to a provider edge device 142 and establishing a circuit 152 between networks 110. Further, access device 112 may be configured to receive, generate, and forward various OAM messages, such as network layer OAM messages like 802.1ag messages. Further, access device 112 may be configured to use continuity check messages (CCMs) to monitor the health of circuit 152. In addition, access device 112 may be configured to respond to certain pre-determined OAM messages, or certain conditions that are illustrated by various OAM messages, by taking an action affecting core network 140, such as by requesting a takedown of a pseudowire.

Next, in block 310, one or more provider edge devices 142 are configured. For example, provider edge devices 142 may be configured to encapsulate network traffic received from one network 110 and route that traffic via a pathway 154 to another network 110. Further, provider edge device 142 may be configured to identify OAM messages associated with network 110, and particularly OAM messages associated with one or more circuits 152. For example, provider edge device 142 may be configured to detect specific 802.1ag messages, such as continuity check messages (CCMs), determine if a CCM is missed, and further configured to send an alert in response when a certain amount of CCMs are missed, as discussed in greater detail below with respect to FIGS. 4 and 5. In another example, provider edge device 142 may be configured to generate Ethernet OAM messages, and may further be configured to translate the Ethernet OAM messages to an action affecting core network 140. Regardless of their origination, such OAM messages may be associated with a particular circuit 152. Therefore, any device receiving the OAM messages may be able to identify which circuit is having a connectivity issue, and may further be configured to imitate an action affecting core network 140.

Next, in block 315, OAM messages are generated and received by one or more devices 112, 142. For example, access device 112 may be configured to both send and receive Ethernet OAM messages, including 802.1ag messages, and send such messages to provider edge device 142. In one example, access device 112 is configured to communicate Ethernet OAM messages with another access device 112 associated with a different network 110. Provider edge device 142 may be configured to monitor for and receive those Ethernet OAM messages, as opposed to merely encapsulating and forwarding them through core network 140.

Next, in decision diamond 320, a fault determination is made. In one example, provider edge device 142 monitors for CCMs and when no CCMs are received within a certain amount of time, provider edge device 142 determines that a fault has occurred. For example, provider edge device 142 may be configured to receive CCMs every 10 ms, and if no CCMs are received within 30 ms, then provider edge device 142 determines that a fault has occurred. In another example, access device 112 makes the fault determination. Ethernet OAM may use fast continuity checks to monitor the health of circuit 152. If enough continuity checks are missed (e.g., a number greater than a pre-determined threshold), then the circuit may be considered down. If there is no fault, then process 300 returns to block 315 and continues to receive and monitor OAM messages. If a fault is determined, then process 300 continues to block 325. In another example, a fault is determined based on the number of expected continuity check messages that failed to arrive. For example, if a certain circuit is dropping frames and/or packets, an edge device may expect a CCM every 10 ms, but only receive a CCM every 50 ms, thus determining that the circuit is experiencing a fault.

In block 325, corrective actions are initiated in response to the fault determination. For example, provider edge device 142 may be monitoring Ethernet OAM messages, and when a problem is detected, provider edge device 142 may be configured to trigger an alarm, such as by sending an appropriate MPLS OAM message. This alarm may be translated directly into an attachment interface status of a pathway 154. The alarm may generate a signal that places the attachment interface in a failed state, and therefore will be bring the pseudowire itself into a failed state. This may then trigger an MPLS OAM message (e.g., an alert) to notify another device of the failure to trigger some corrective action. In such an example, other attachment interfaces on the same port of the edge device 142 will not be affected by the downed pseudowire. Following block 325, process 300 ends.

Figure 4:
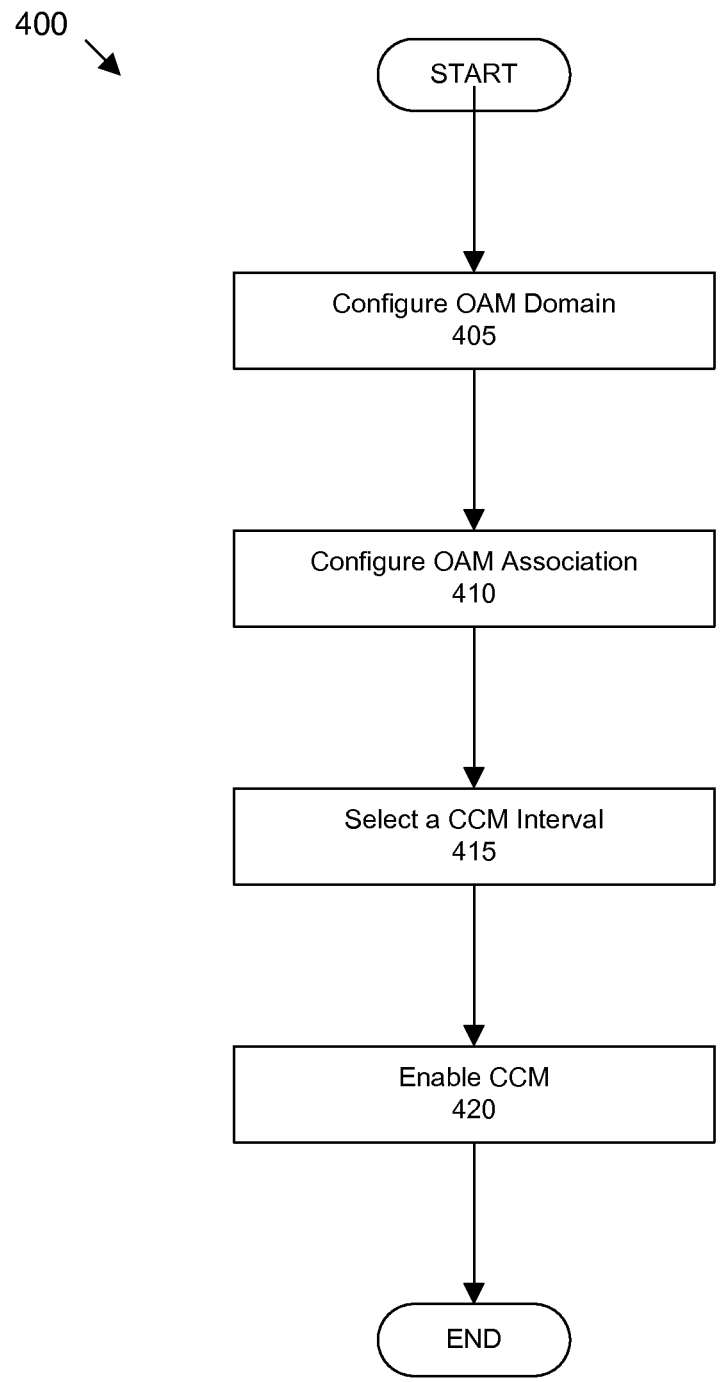
FIG. 4 illustrates an exemplary process for configuring OAM between an access device and a provider edge device.

FIG. 4 illustrates an exemplary process 400 for configuring OAM between an access device 112 and a provider edge device 142. As previously discussed, an access device 112 and a provider edge device 142 may be configured to utilize Ethernet OAM, such as 802.1ag to monitor the health of a circuit. Process 400 begins in block 405 by configuring an OAM domain. For example, in order for access device 112 and provider edge device 142 to start exchanging Ethernet OAM, each device must be configured to be part of the same OAM domain. Thus, in block 405, access device 112 in access network 144 and a provider edge device 142 that faces the particular access network 144 are both configured to be part of the same OAM domain.

Next, in block 410, an OAM association is configured. Generally, access device 112 and provider edge device 142 are each configured to be maintenance entity points (MEPs) with appropriate MEP identification such that each will process OAM messages with from the other. For example, once configured with the appropriate association, access device 112 and provider edge device 142 will process each other's CCMs, as opposed to merely passing the CCM along to another entity. Further, each can then respond to various messages that indicate a problem has occurred with respect to a circuit.

Next, in block 415, a continuity check interval is selected. The continuity check interval determines how much time must pass without receiving a CCM before determining that a fault has occurred. The interval may be as short as 3.3 milliseconds, and may be as long as 10 minutes. The selection of the CCM interval may depend on any number of factors. The longer the CCM interval, the longer the process takes to detect a fault. However, should an interval be too short, the system may trigger false alarms. Generally, access device 112 and provider edge device 142 are each configured with a similar CCM interval. However, each may be configured with a different CCM interval. In addition to the continuity check interval, other criteria relating to CCMs may be configured. For example, a continuity check loss threshold may also be configured on each device. The continuity check loss threshold determines the number of continuity check messages that can be lost before marking the MEP as down. The default value is 3 protocol data units (PDUs).

Next, in block 420, each device is configured to enable CCMs. For example, CCMs are enabled on access device 112 and provider edge device 142 such that each will send CCMs to one another. Following block 420, process 400 ends.

Figure 5:
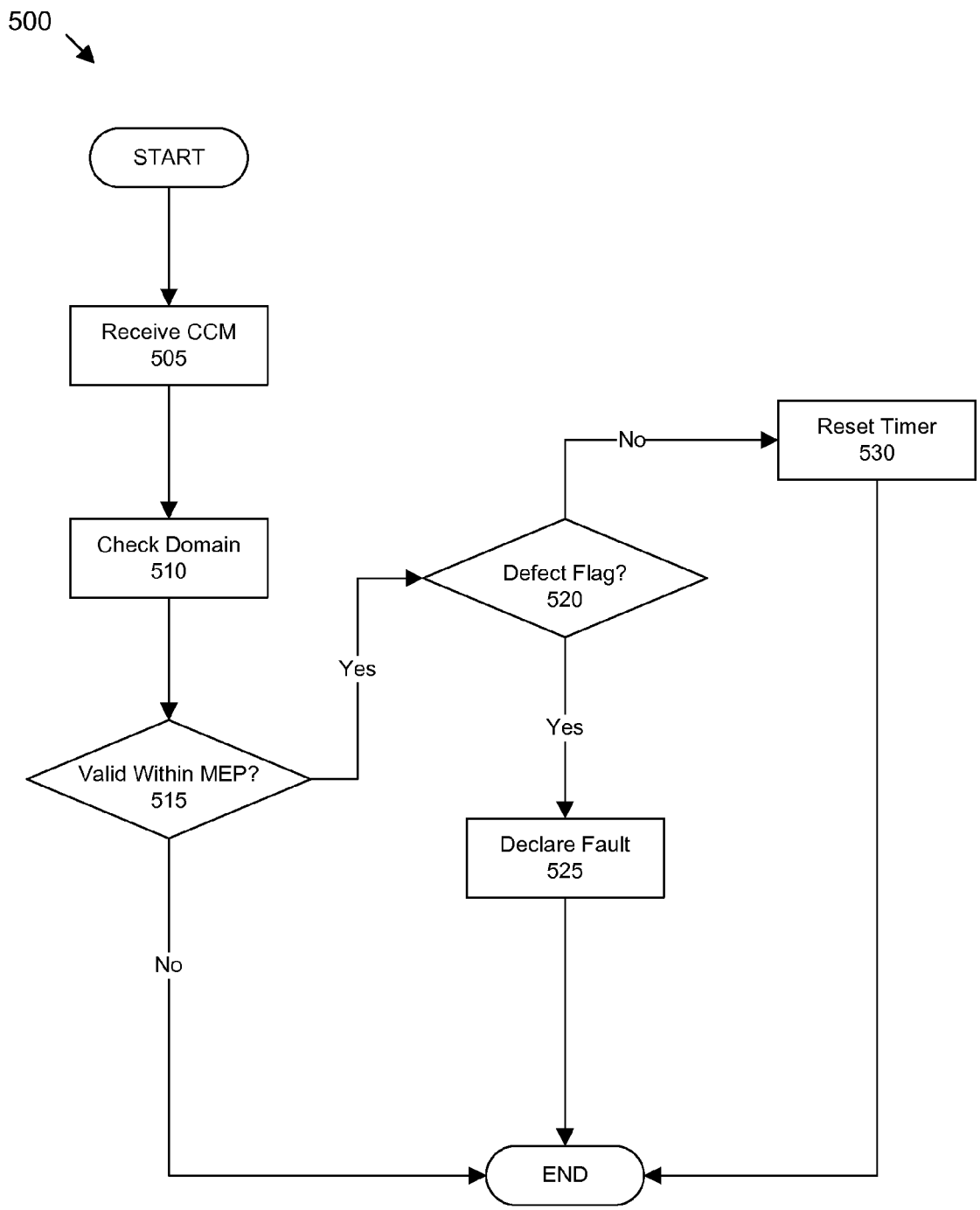
FIG. 5 illustrates an exemplary process for determining whether a fault has occurred.

FIG. 5 illustrates an exemplary process 500 for determining whether a fault has occurred, for example, as discussed with respect to decision diamond 320 of FIG. 3. Process 500 begins in block 505 when a device receives a CCM. For example, provider edge device 142 receives a CCM from access device 112.

Next, in block 510, the domain of the received CCM is checked. For example, a device may be configured to only process OAM messages that are within a particular maintenance domain. For example, provider edge device 142 may be configured to be part of a particular domain, as discussed above with respect to FIG. 4.

Next, in decision diamond 515, it is determined whether the CCM is within the domain of the maintenance entity point (MEP). For example, provider edge device 142 may be configured as a MEP within a particular domain. Further, provider edge device 142 may be configured with certain associations. Depending on the MEP identification and domain, a device, such as provider edge device 142, determines whether to process the received CCM. If the CCM is within the domain and is associated properly, then the CCM is processed further and process 500 continues to block 520. If the received CCM is not within the particular domain or is not associated properly, the process 500 ends.

In decision diamond 520, the CCM is checked for a defect flag. For example, provider edge device 142 may check to see if a remote defect flag (RDI) is set within the received CCM, thus signaling that a fault has occurred with respect to a particular circuit. If a defect flag is found, then process 500 continues to block 525. If no defect flag is detected, then process 500 continues to block 530.

In block 525, a fault is declared, as discussed above with respect to decision diamond 320 of FIG. 3. In block 530, a timer is reset. For example, provider edge device 142 may reset a CCM interval timer to continue tracking the time between received CCMs. Following block 530, process 500 ends.

In addition, a device, such as provider edge device 142, may be configured to declare a fault if a timer expires during a time period when no CCMs were received. Such a process may operate independently of process 500. Thus, if no further CCMs are received, a fault is declared, as previously discussed with respect to FIG. 3. For example, as discussed above, a device may be configured with a particular CCM interval, and may maintain a timer to determine the time between received CCMs. If the time between received CCMs is greater than the CCM interval, the device may declare a fault. In another example, a device, such as provider edge device 142, determines whether the time between received CCMs is greater than some multiplication factor beyond the CCM interval. For example, a CCM interval may be 5 ms. However, a device may be configured to only declare a fault if no CCM is received within 17.5 ms, 3.5 times the CCM interval.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
   identifying a circuit to monitor, the circuit including a virtual connection between multiple networks via a provider network and a physical connection between an access device and a provider edge device configured to provide an entry point to the provider network;
   configuring a maintenance entity association between the access device and the provider edge device such that at least one of the access device and provider edge device is configured to perform a fault determination and initiate a corrective action in response to a network management message of a first protocol, the association including at least one criterion for determining presence of connectivity issues;
   receiving, using at least one of the provider edge device and the access device, the network management message associated with the circuit;
   determining, by the provider edge device according to the at least one criterion of the association, if the physical connection portion of the circuit is experiencing a connectivity issue based on the network management message; and
   automatically in response to determining that the physical connection portion of the circuit is experiencing a connectivity issue, translating the network management message of the first protocol to an interface status of a second protocol to identify a pseudowire pathway associated with the physical connection portion experiencing the connectivity issue, placing the interface status of the identified pseudowire pathway in a failed state, and sending a release message thereby initiating a takedown of the identified pseudowire pathway to withdraw at least a portion of the virtual connection.

2. The method of claim 1, wherein the pathway is a data link layer pathway.

3. The method of claim 1, wherein the circuit is at least one of an Ethernet Virtual Connection (EVC), an Ethernet Virtual Private Line (EVPL), a Virtual Local Area Network (VLAN), and a Virtual Private Network (VPN) Tunnel.

4. The method of claim 1, wherein the circuit is a Virtual Local Area Network (VLAN) tunnel and identified by a Virtual Local Area Network (VLAN) tag.

5. The method of claim 1, wherein the network management message is an Ethernet OAM message in accordance with IEEE 802.1ag.

6. The method of claim 1, wherein the provider edge device is a MultiProtocol Label Switching (MPLS) label edge router.

7. The method of claim 1, wherein the connectivity issue with the physical connection portion is determined based on a timing between network management messages reaching a multiplication factor of a continuity check message interval and
   further comprising initiating an alert when it is determined that the circuit is experiencing the connectivity issue based on the at least one criterion.

8. The method of claim 1, further comprising:
   configuring the provider edge device to detect an Ethernet 802.1ag continuity check message;
   determining, in the provider edge device, a number of missed Ethernet 802.1ag continuity check messages; and
   determining that the circuit is experiencing a connectivity issue when the number of missed Ethernet 802.1ag continuity check messages exceeds a predetermined threshold based on a predetermined time period.

9. The method of claim 1, further comprising:
   checking a domain of the network management message;
   determining whether the provider edge device is within the domain of the network management message and accordingly whether the network management message should be handled by the provider edge device.

10. A system, comprising:
    a provider network configured to facilitate data communications between a plurality of networks using a data link layer communications protocol;
    a provider edge device communicatively coupled to an access device, the access device communicatively coupled to at least one of the plurality of networks, the provider edge device configured to provide an entry point to the provider network to hand off network traffic from the at least one of the plurality of networks to the provider network;
    a circuit configured to include a logical communications pathway between at least two of the plurality of networks via the provider network and a physical connection between the access device and the provider edge device;
    a pseudowire pathway configured to support the logical communications pathway of the circuit, wherein the pseudowire pathway is associated with the data link layer communications protocol; and
    wherein the provider edge device is configured to:
       configure a maintenance entity association between the access device and the provider edge device such that at least one of the access device and provider edge device is configured to perform a fault determination and initiate a corrective action in response to a network management message of a first protocol, the association including at least one criterion for determining presence of connectivity issue;
       receive from the access device the network management message associated with the circuit;
       determine according to the at least one criterion of the association if the physical connection portion of the circuit is experiencing a connectivity issue based on the network management message; and automatically in response to determining that the physical connection portion of the circuit is experiencing a connectivity issue, translate the network management message of the first protocol to an interface status of a second protocol to identify a pseudowire pathway associated with the physical connection portion experiencing the connectivity issue, initiate placement of the interface status of the identified pseudowire pathway in a failed state, and initiate a takedown of the identified pseudowire pathway.

11. The system of claim 10, wherein the data link layer communications protocol is at least one of MultiProtocol Label Switching (MPLS), Frame Relay, and Asynchronous Transfer Mode (ATM).

12. The system of claim 10, wherein the network communicatively coupled to the access device utilizes Ethernet, and the access device is configured to facilitate communication between the Ethernet network and the provider network.

13. The system of claim 10, wherein the circuit is at least one of an Ethernet Virtual Connection (EVC), an Ethernet Virtual Private Line (EVPL), a Virtual Local Area Network (VLAN), and a Virtual Private Network (VPN) Tunnel.

14. The system of claim 10, wherein the circuit is a Virtual Local Area Network (VLAN) tunnel and identified by a Virtual Local Area Network (VLAN) tag.

15. The system of claim 10, wherein the network management message is an Ethernet OAM message in accordance with IEEE 802.1ag.

16. The system of claim 10, wherein the provider edge device is a MultiProtocol Label Switching (MPLS) label edge router.

17. The system of claim 10, wherein the connectivity issue with the physical connection portion is determined based on a timing between network management messages reaching a multiplication factor of a continuity check message interval and
wherein at least one of the provider edge device and the access device is further configured to initiate an alert when it is determined that the circuit is experiencing the connectivity issue based on the at least one criterion.

18. The system of claim 10, wherein the provider edge device is further configured to:
detect an Ethernet 802.1ag continuity check message;
determine a number of missed Ethernet 802.1ag continuity check messages; and
determine that the circuit has experienced a fault when the number of missed Ethernet 802.1ag continuity check messages exceeds a predetermined threshold based on a predetermined time period.

19. The system of claim 10, wherein the provider edge device is further configured to:
check a domain of the network management message;
determine whether the provider edge device is within the domain of the network management message and accordingly whether the network management message should be handled by the provider edge device.

20. A non-transitory computer-readable medium tangibly embodying computer-executable instructions configured to:
facilitate data communication between a network and a provider network, wherein the network is configured to utilize a first protocol and the provider network is configured to utilize a second protocol;
configure a maintenance entity association between an access device and a provider edge device such that at least one of the access device and provider edge device configured to perform a fault determination and initiate a corrective action in response to a network management message of the first protocol, the association including at least one criterion for determining presence of connectivity issues;
receive the network management message associated with a circuit, the circuit including a virtual connection between multiple networks via the provider network and a physical connection between an access device and a provider edge device configured to provide an entry point to the provider network;
determine according to the at least one criterion of the association if the physical connection portion of the circuit is experiencing a connectivity issue based on the network management message; and
automatically in response to determining that the physical connection portion of the circuit is experiencing a connectivity issue, translate the network management message of the first protocol to an interface status of the second protocol to identify a pseudowire pathway associated with the physical connection portion experiencing the connectivity issue, initiate placement of the interface status of the identified pseudowire pathway in a failed state, and initiate a takedown of the identified pseudowire pathway.

21. The computer-readable medium of claim 20, wherein the first protocol is at least one of MultiProtocol Label Switching (MPLS), Frame Relay, and Asynchronous Transfer Mode (ATM), and wherein the second protocol is Ethernet.

22. The computer-readable medium of claim 20, wherein the plurality of network management messages associated with the circuit are Ethernet OAM messages in accordance with IEEE 802.1ag.

23. The computer-readable medium of claim 20, wherein the at least one criterion is based on a timing between network management messages reaching a multiplication factor of a continuity check message interval and further comprising computer-executable instructions configured to send an alert to a customer associated with the circuit when it is determined that the circuit is experiencing a connectivity issue based on the at least one criterion.

24. The computer-readable medium of claim 20, further comprising computer-executable instructions configured to:
detect an Ethernet 802.1ag continuity check message;
determine a number of missed Ethernet 802.1ag continuity check messages; and
determine that the circuit is experiencing a connectivity issue when the number of missed Ethernet 802.1ag continuity check messages exceeds a predetermined threshold based on a predetermined time period.

25. The computer-readable medium of claim 20, further comprising computer-executable instructions configured to:
check a domain of the network management message;
determine whether the provider edge device is within the domain of the network management message and accordingly whether the network management message should be handled by the provider edge device.

* * * * *